United States Patent
Hennes et al.

(10) Patent No.: US 11,148,681 B2
(45) Date of Patent: Oct. 19, 2021

(54) METHOD AND DEVICE TO ENABLE A FAST STOP OF AN AUTONOMOUSLY DRIVING VEHICLE

(71) Applicant: FORD GLOBAL TECHNOLOGIES, LLC, Dearborn, MI (US)

(72) Inventors: Nikica Hennes, Aachen (DE); Philipp Wolf, Cologne (DE); Stefan Wolter, Wuerselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 332 days.

(21) Appl. No.: 16/189,666

(22) Filed: Nov. 13, 2018

(65) Prior Publication Data

US 2019/0144000 A1 May 16, 2019

(30) Foreign Application Priority Data

Nov. 13, 2017 (DE) ...................... 10 2017 220 116.9

(51) Int. Cl.
*B60W 50/10* (2012.01)
*G06Q 50/30* (2012.01)
(Continued)

(52) U.S. Cl.
CPC .............. *B60W 50/10* (2013.01); *B60K 35/00* (2013.01); *B60K 37/06* (2013.01); *B60W 30/181* (2013.01);
(Continued)

(58) Field of Classification Search
CPC ............... B60W 50/10; B60W 30/181; B60W 2300/10; B60W 60/001; B60W 60/0013;
(Continued)

(56) References Cited

U.S. PATENT DOCUMENTS

| 8,643,512 B2* | 2/2014 | Hsieh | G08G 1/133 340/994 |
| 9,194,168 B1* | 11/2015 | Lu | B60R 25/24 |

(Continued)

FOREIGN PATENT DOCUMENTS

| DE | 102005058628 A1 | 6/2007 |
| DE | 102012001312 A1 | 8/2012 |

(Continued)

OTHER PUBLICATIONS

DE Examination Report DE 10 2017 220 116.9 Filed Oct. 31, 2018. 7 pages.

(Continued)

*Primary Examiner* — Angelina Shudy
(74) *Attorney, Agent, or Firm* — Brooks Kushman P.C.; Frank MacKenzie

(57) ABSTRACT

The autonomously driving vehicle is fitted with a GPS unit to which a library of points of interest is assigned, and comprises a human-machine interface that is connected to the GPS unit and which comprises at least one of the following input means for the input of a command for the most immediate possible stopping of the vehicle: a unit for speech input that is connected to the interface, a module for recognizing gestures that is connected to the interface, and a touch-sensitive screen that is connected to the interface.

9 Claims, 2 Drawing Sheets

(51) Int. Cl.
| | |
|---|---|
| *G01C 21/34* | (2006.01) |
| *B60K 37/06* | (2006.01) |
| *G01C 21/36* | (2006.01) |
| *G06F 16/29* | (2019.01) |
| *B60K 35/00* | (2006.01) |
| *B60W 30/18* | (2012.01) |
| *G05D 1/00* | (2006.01) |
| *G05D 1/02* | (2020.01) |

(52) U.S. Cl.
 CPC ..... *G01C 21/3476* (2013.01); *G01C 21/3614* (2013.01); *G05D 1/0088* (2013.01); *G05D 1/0278* (2013.01); *G06F 16/29* (2019.01); *G06Q 50/30* (2013.01); *B60K 2370/146* (2019.05); *B60K 2370/148* (2019.05); *B60K 2370/1438* (2019.05); *B60K 2370/1464* (2019.05); *B60K 2370/175* (2019.05); *B60W 2300/10* (2013.01); *B60Y 2200/143* (2013.01); *B60Y 2200/30* (2013.01); *G05D 2201/0213* (2013.01)

(58) Field of Classification Search
 CPC ......... B60W 60/0016; B60W 60/0024; B60W 60/0025; B60W 60/00253; B60W 60/00256; B60W 60/007; G06F 16/29; B60K 35/00; B60K 37/06; B60K 2370/1464; B60K 2370/175; B60K 2370/148; B60K 2370/146; B60K 2370/1438; G01C 21/3476; G01C 21/3614; G05D 1/0088; G05D 1/0278; G05D 2201/0213; G06Q 50/30; B60Y 2200/143; B60Y 2200/30
 See application file for complete search history.

(56) References Cited

U.S. PATENT DOCUMENTS

| | | | | |
|---|---|---|---|---|
| 9,377,315 | B2* | 6/2016 | Grover | G01C 21/34 |
| 9,523,984 | B1* | 12/2016 | Herbach | G05D 1/0088 |
| 9,613,386 | B1* | 4/2017 | Arden | G08G 1/205 |
| 9,835,465 | B2 | 12/2017 | Stefan | |
| 10,371,811 | B2* | 8/2019 | Shokonji | G01S 13/867 |
| 10,457,210 | B2* | 10/2019 | Leem | B60R 1/00 |
| 10,550,817 | B2* | 2/2020 | Okitsu | F02N 11/0822 |
| 10,591,916 | B2* | 3/2020 | Fairfield | G06Q 10/02 |
| 10,681,513 | B2* | 6/2020 | Iagnemma | H04W 4/70 |
| 10,852,153 | B2* | 12/2020 | Yun | B62D 15/0285 |
| 2008/0088425 | A1* | 4/2008 | Hara | B60K 35/00 340/438 |
| 2011/0118900 | A1* | 5/2011 | Uchida | G05D 1/0297 701/2 |
| 2012/0078504 | A1* | 3/2012 | Zhou | G01C 21/3611 701/411 |
| 2014/0136414 | A1 | 5/2014 | Abhyanker | |
| 2014/0277900 | A1 | 9/2014 | Abhyanker | |
| 2015/0095350 | A1* | 4/2015 | Chen | G01C 21/3679 707/749 |
| 2015/0323932 | A1* | 11/2015 | Paduano | G05D 1/0676 701/3 |
| 2015/0346727 | A1* | 12/2015 | Ramanujam | B62D 15/0285 701/23 |
| 2016/0301698 | A1 | 10/2016 | Katara et al. | |
| 2016/0349750 | A1 | 12/2016 | Nemec et al. | |
| 2017/0192432 | A1 | 7/2017 | Arden et al. | |
| 2018/0113455 | A1* | 4/2018 | Iagnemma | B60W 30/00 |
| 2018/0113456 | A1* | 4/2018 | Iagnemma | G08G 1/0133 |
| 2018/0113457 | A1* | 4/2018 | Iagnemma | B60W 30/06 |
| 2018/0113470 | A1* | 4/2018 | Iagnemma | G05D 1/0088 |
| 2018/0147988 | A1* | 5/2018 | Lee | G01C 21/3697 |
| 2018/0281794 | A1* | 10/2018 | Ravichandran | B60K 37/06 |
| 2018/0281817 | A1* | 10/2018 | Ravichandran | B60W 50/10 |
| 2018/0284772 | A1* | 10/2018 | Ravichandran | B60W 10/04 |
| 2018/0292829 | A1* | 10/2018 | Li | B60W 50/10 |
| 2018/0322603 | A1* | 11/2018 | Hu | G06Q 50/30 |
| 2019/0079509 | A1* | 3/2019 | Bosworth | G06Q 10/083 |
| 2019/0079519 | A1* | 3/2019 | Hwang | G05D 1/0212 |
| 2019/0144000 | A1* | 5/2019 | Hennes | B60K 35/00 701/23 |
| 2019/0212738 | A1* | 7/2019 | Umetani | B60Q 1/503 |
| 2019/0263422 | A1* | 8/2019 | Enthaler | G06K 9/00355 |
| 2019/0318625 | A1* | 10/2019 | Morimura | G08G 1/096791 |
| 2020/0041993 | A1* | 2/2020 | Li | B60W 60/001 |
| 2020/0097007 | A1* | 3/2020 | Dyer | B60W 60/00253 |
| 2020/0117215 | A1* | 4/2020 | Shiga | B60W 60/00253 |
| 2020/0122725 | A1* | 4/2020 | Sauvlet | B60W 30/181 |
| 2020/0307626 | A1* | 10/2020 | Noguchi | G05D 1/021 |
| 2020/0319644 | A1* | 10/2020 | Li | B60W 50/14 |
| 2021/0150896 | A1* | 5/2021 | Rakshit | G08G 1/0145 |

FOREIGN PATENT DOCUMENTS

| | | |
|---|---|---|
| DE | 102015204947 A1 | 9/2016 |
| JP | H03241499 A | 10/1991 |
| JP | 2017044707 A | 3/2017 |
| KR | 1020170075302 A | 7/2017 |
| WO | 2011154680 A1 | 12/2011 |
| WO | 2016107674 A1 | 7/2016 |

OTHER PUBLICATIONS

Taxonomy and Definition for Terms Related to Driving Automation Systems for On-Road Motor Vehicles. SAE International. Sep. 2016. 30 pages.
European Search Report for Application No. 18204846.2, dated Apr. 2, 2019, 10 pages.

* cited by examiner

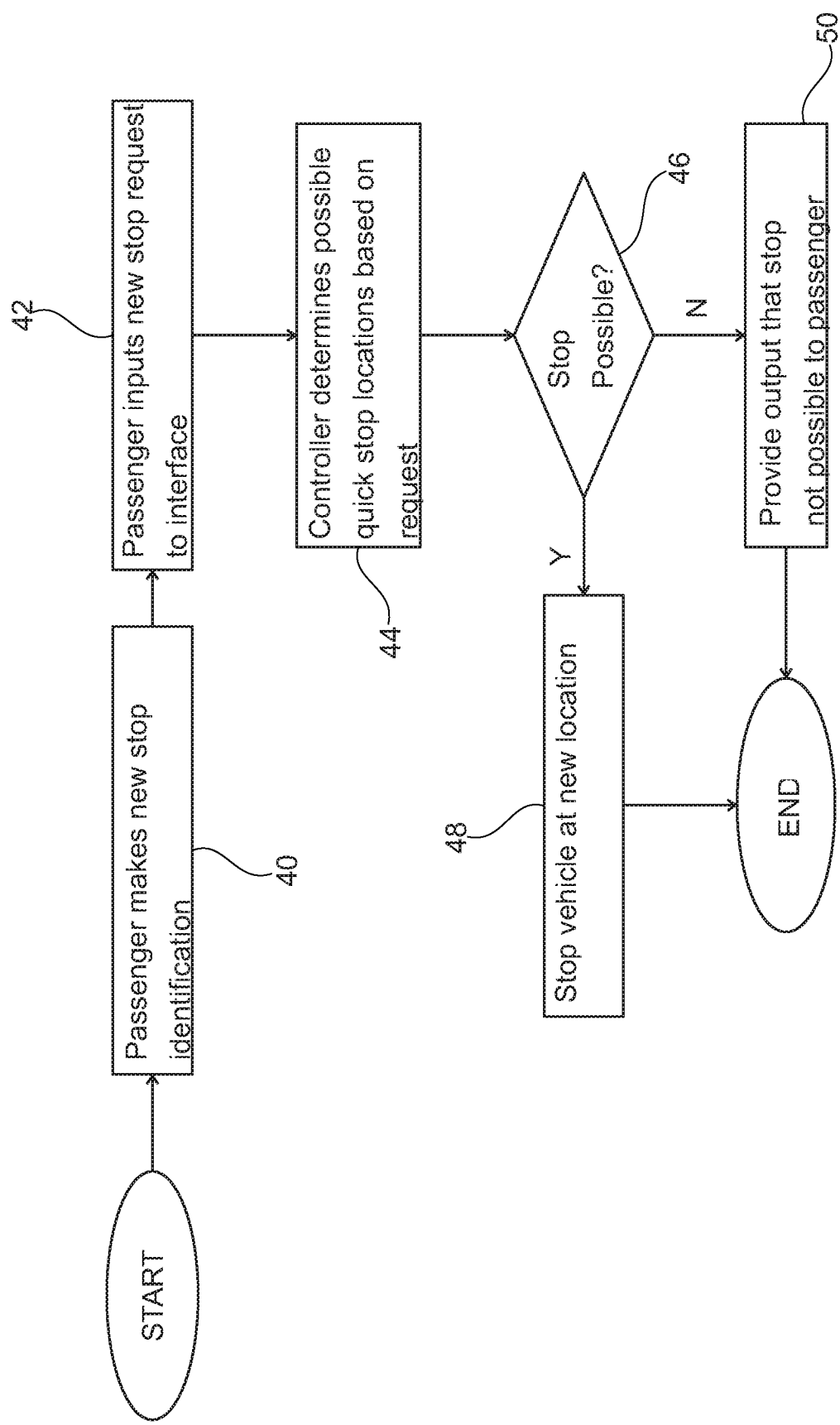

_US 11,148,681 B2_

METHOD AND DEVICE TO ENABLE A FAST STOP OF AN AUTONOMOUSLY DRIVING VEHICLE

CROSS-REFERENCE TO RELATED APPLICATIONS

This application claims foreign priority benefits under 35 U.S.C. § 119(a)-(d) to DE Application 10 2017 220 116.9 filed Nov. 13, 2017, which is hereby incorporated by reference in its entirety.

TECHNICAL FIELD

Various embodiments relate to a human-machine interface solution to enable a fast stop of an autonomously driving vehicle, in particular of a fully autonomous shuttle.

BACKGROUND

Autonomous driving has already begun to be practiced and is under constant further development at present. The SAE J3016 standard describes the classification and definition of terms for road motor vehicles with systems for autonomous driving. It has been in-force since January 2014. The classification recognizes six levels, and describes their minimum requirements. A vehicle can change between the levels depending on its equipment and its usage in said vehicle.

Levels 4 and 5 are relevant to the present disclosure. Level 4 relates to automated guidance of the vehicle with the expectation that the driver reacts when requested to intervene. In the absence of human reaction, the vehicle continues to drive autonomously. Level 5 relates to fully autonomous driving, in which the dynamic driving task is carried out like a human driver on a roadway suitable for the vehicle and under arbitrary environmental conditions. The human being can nevertheless intervene and can still make control inputs to the vehicle.

US 2014/0277900 A1 and US 2014/0136414 A1 disclose relatively small driverless delivery vehicles that navigate fully autonomously from destination to destination. This is possible without great risk to or interaction with the road traffic, since these delivery robots predominantly move on pavements. The disclosure and present invention are, on the other hand, primarily suited and directed to motor vehicles in road traffic which usually have at least one person on-board as a passenger, and which can be driven to a range of different destinations.

DE 10 2015 204 947 A1 relates to a method and a device for the operation of a motor vehicle when its driver has to execute a range of tasks along a predetermined route, each of which requires that the driver stops the motor vehicle, leaves it and covers a certain distance on foot, wherein the motor vehicle is designed to drive optionally under the control of a human driver located on board the motor vehicle or, at least partially, autonomously. When the driver stops the motor vehicle for the purpose of executing a task, a check is made on the basis of an electronic plan of the driver's tasks as to whether it would be more favorable for the task execution for the motor vehicle to remain stationary at the place where it was stopped or to continue driving to a stopping point lying in the direction of travel, wherein the motor vehicle in the latter case drives autonomously, without the driver, to the next stopping point located in the direction of travel, and remains stationary there.

SUMMARY

According to various embodiments of the present disclosure, a shuttle refers to an apparatus of motorized traffic usable by a plurality of persons. This includes, for example, shuttle buses and commuter buses. The shuttles addressed by the present disclosure are characterized by a free choice of the destination and of the route. To this extent they differ from shuttles of level 0, which as a rule implement outbound and return transport connections at times that in most cases are specified (every half-hour, hourly etc.). They do not, however, differ in that the handling is uncomplicated. The routes for a shuttle according to the present disclosure may be chosen at short notice, and may also be roughly specified in terms of time in advance, so that a passenger does not get onto a shuttle that is already programmed for a destination far in the north while the passenger is trying to reach a destination in the south. The shuttles according to the invention also include, for example, apron buses at an airport terminal which drive on the airport apron, buses that transport exhibition visitors from a parking space to an exhibition entrance, etc.

The present disclosure is not restricted to shuttles. It also relates to normal passenger cars or motor vehicles. In one embodiment, the vehicle has a single passenger on-board. In other embodiments, a plurality of passengers with different destinations are on-board. In some embodiments, the passengers may have each entered the vehicle at different stopping points along a route. Other embodiments relate to vehicles for passengers that have entered together at a specified stopping point or starting point on a route.

Self-driving or autonomous vehicles, and here, in particular, shuttles that drive according to SAE levels 4 and 5, will be available increasingly in the coming years. At the beginning of the journey, the at least one passenger must enter a destination he desires. Multiple passengers of the shuttle may each enter their own, usually different, destinations. The vehicle may only start along a route or journey after at least one destination input. After the start, and during the journey, changes to the route or journey may only be entered via an additional destination entry from a passenger.

The following problem, however, arises here for control of the autonomous vehicle: it is no longer possible for the vehicle to stop quickly at an interesting or desired point on the road if a passenger spontaneously wants or decides to make such a stop. Normally, a decision to stop immediately at an interesting point is made very quickly by a vehicle occupant. In a classic, conventional vehicle with an independently driving driver, e.g. SAE level 0, it is not usually a problem to stop the vehicle immediately and, if necessary, to look for a stopping or parking space. However, in the case of the vehicles according to SAE levels 4 and 5 under consideration by the present disclosure, a new destination input must laboriously be made and entered by a passenger. Even with modern input systems, speech input, for example, this is usually laborious, and requires a certain length of time. There is therefore a problem if a passenger sees desired stopping point or destination such as a restaurant, a shop or a cinema on the road, to which a visit is wanted, spontaneously and at short notice. The passenger also is as-a-rule not immediately prepared for to enter a destination at such short notice and is also often unfamiliar with how he can achieve a spontaneous stop. It is therefore important that the spontaneous stop can be achieved with the simplest possible means and without extensive previous instruction.

On this basis it is the object of the present disclosure to develop an autonomously driving vehicle, in particular such a shuttle, in such a way that it can thus quickly and spontaneously be halted, as is known for classic vehicles of level 0. The measures necessary to achieve the stop should not here require previous exercise, but it should be possible to carry them out very simply and obviously.

This object is achieved through the method for quickly stopping an autonomously driving vehicle on the basis of a command of a passenger located on-board the vehicle and during an autonomous travel of the vehicle to a previously selected final destination, with the following method steps:

a) the passenger identifies an intermediate destination not previously communicated to the vehicle, b) the passenger gives a stop command to an interface, for example, through speech input, gesture input, or input on a touch-sensitive screen, c) the interface, taking data related to the current position of the vehicle from a GPS unit and a list of possible, predetermined stopping points into account, determines whether it is possible to stop the vehicle immediately or close by, determines at least one free stopping point with the help of the control software on a vehicle control system of the vehicle, and informs the passenger that a stop will follow if a stop is possible and a free stopping place has been found.

d) the interface causes the control system of the vehicle to drive to the free stopping place and to stop there.

The object is further achieved through an autonomously driving vehicle, in particular an autonomously driving shuttle, with a GPS unit to which a library of points of interest is assigned, characterized by a human-machine interface that is connected to the GPS unit and to a vehicle system controller and which comprises at least one of the following input means for the input of a command for the most immediate possible stopping of the vehicle:

a unit for speech input that is connected to the interface, a module for recognizing gestures that is connected to the interface, and a touch-sensitive screen that is connected to the interface. The screen can here either be fastened in the vehicle, or part of a mobile device, e.g. a mobile telephone, that is in wireless communication with the vehicle control system.

Various embodiments according to the present disclosure provide a way of quickly stopping an autonomous shuttle, and an autonomously driving vehicle in general, at or near a point of interest that is spontaneously indicated during a planned journey or route and is generally along the route. If one of the on-board passengers wants to stop the vehicle, the following methods can be used:

1. speech-operated command: the passenger enters a predefined speech command, such as "Stop at the restaurant on the right-hand side" or "Stop on the left-hand side in 50 meters". The speech command may be in the form of a natural language command that is recognized by the vehicle system controller.

2. command through a special gesture, for example a wave gesture that is made with the hand. It is possible to recognize the passenger's hand movements through on-board cameras on the vehicle that observe the passengers and that are in communication with the vehicle system controller. Pointing gestures made by a passenger may be used to quickly indicate the place at which a passenger wants the autonomously driving vehicle to stop. The wave gesture can be activated in advance through a button actuation; e.g. an input must first be made on a field of a touch-sensitive screen on the human machine interface, so that the interface is informed that a special command, in particular a stop command, now follows. This can also be done in combination with a speech control.

3. the command can also be entered by actuating a special button on the human machine interface or otherwise provided on the vehicle and in communication with the vehicle system controller. For example, the passenger may provide the input by pressing on the screen of an on-board GPS system or routing system, or on an emergency stop button. An emergency stop button corresponds to a means of stopping such as the emergency brake, as is, for example, provided in railway trains.

General points of interest are available through their GPS data, and are stored or otherwise accessible on database in communication with the vehicle system controller, so that a normal point of interest that is entered by one of the commands is easy to identify. This applies, for example, to restaurants, shops, parks, museums, and other known destinations along the road. Now, however, there are also individual and unpredictable points of interest that a passenger may want to reach or spontaneously stop that vehicle. If, for example, a passenger recognizes an acquaintance on the road while the vehicle is passing by and wants to speak to him immediately, the associated GPS destination data is of no help. The present disclosure provides for stopping the vehicle as quickly as possible here as well.

The control unit of the vehicle first establishes whether a stop is at all possible, either immediately or close to the point of interest that has been indicated. If that is the case, the vehicle will stop.

The vehicle control unit reacts to a spontaneously, unplanned stop command from a passenger that has been received and recognized while the vehicle is on-route to a planned destination. The control unit outputs a statement as to whether a stop is possible at or nearby the desired location. If a stop at the desired location is not possible, the control unit preferably outputs a statement to the passenger via the human machine interface regarding where the next stop can be made and the vehicle halted. If appropriate, the control unit offers the passenger concerned the possibility of accepting the proposed stop or not, via the human machine interface.

In various embodiments, the vehicle control unit reacts to a recognized stop command with a further query to the passenger via the human machine interface. This query can be related to the duration of the stop. A query is made in this way as to whether only a short halt (e.g. on the order of minutes) for getting out is wanted, or whether a longer halt is desired or required. The control unit can also ask whether a short halt is wanted by the passenger, or whether the passenger desires the vehicle to park for a certain, specified length of time. The passenger can then make the required input to the vehicle control system via the human machine interface. The control unit may use this information to makes the statement given above as to whether the desired kind of stop can be realized by the vehicle or not.

BRIEF DESCRIPTION OF THE DRAWINGS

FIG. 2 shows a flow diagram of the method for spontaneously stopping a vehicle according to a passenger input and for use with the vehicle of FIG. 1.

DETAILED DESCRIPTION

Figure 1:
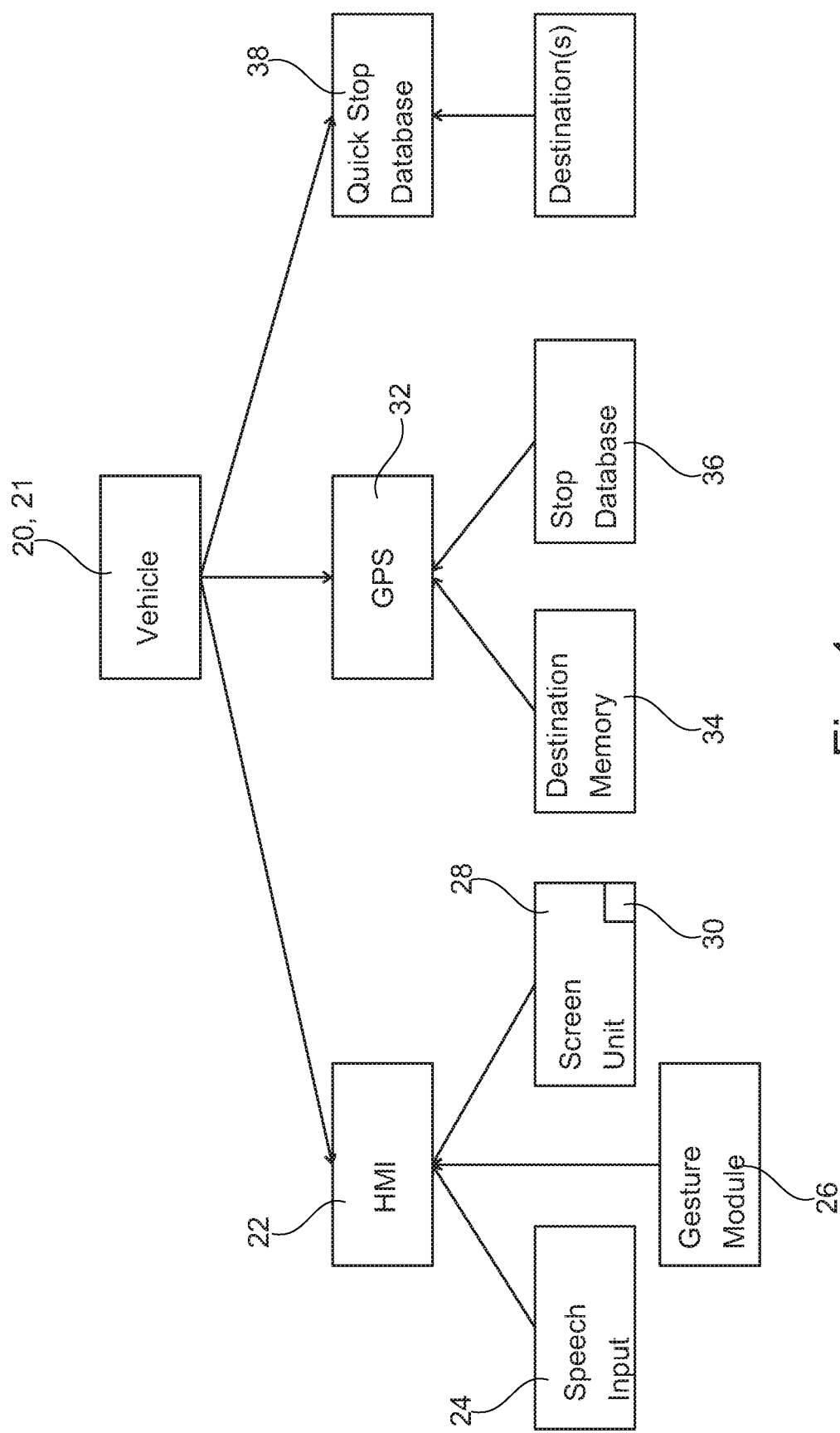
FIG. 1 shows a block diagram of the functions and circuitry of an autonomous vehicle according to an embodiment.

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or NVRAM, or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

FIG. 1 shows an autonomously driving vehicle 20 that is fitted with a vehicle controller 21, and a human-machine interface (HMI) 22 according to the present disclosure. For its part, the HIM 22 has a unit for speech input 24, a module for recognizing gestures 26 and a touch-sensitive screen 28.

The unit for speech input 24 receives speech commands via a microphone and passes these on to the interface 22. One example of a speech command is "Stop in front of the restaurant on the right-hand side of the road". The speech input unit, HMI, and/or vehicle control unit may include software for use in recognizing natural language commands, and determining a requested action by the passenger.

The module for recognizing gestures 26 comprises at least one camera and may be designed for the detection of specific gestures found in a catalog of gestures. If, for example, a gesture is entered that is assigned to an immediate stop, for example a wave gesture, the module 26 passes corresponding information on to the interface 22. Other predetermined gestures, such as pointing or the like, are also contemplated for use with the module 26.

A stop command for the vehicle may also be entered through the touch-sensitive screen 28. This screen 28 can have a field 30 or specified region 30 to which a stop command is assigned. In one example, the input of a speech command and/or a gesture for immediately stopping the vehicle 20 requires the actuation of the field 30 beforehand. In this way, it is ensured that commands that the passenger concerned did not want to give are not accidentally given through gestures or through a conversation.

In one example, the field 30 is formed on the touch-sensitive screen 28, e.g. as a region of the screen and marked or otherwise indicated as such. The field 30 can, however, also be implemented in other ways, for example as a simple push or other tactile button, or as an emergency stop device such as, for example, an emergency brake, a stop-request cord, etc.

The vehicle 20 is, furthermore, fitted with a GPS unit 32 in communication with the vehicle system controller. The GPS unit 32 is in communication with storage memory containing a library 34 of points of interest, such as GPS waypoints associated with known or predeterminable destinations, as well as a database with data associated with road and other routing information. The GPS unit 32 is informed of the current location of the travelling vehicle 20, for example, from a GPS antenna on-board the vehicle, and then, if a passenger gives a concrete stop command, for example as above, takes the coordinates of the corresponding restaurant from this library 34.

The GPS unit 32 is furthermore linked to a list of possible stopping points 36 that are stored in memory in a list or database. The possible stopping points for the vehicle 20, selected for example from a high-quality roadmap, or in particular recognized during the capture of a roadmap, are contained therein. The stopping points include parking areas, passenger drop off and pick up zones, wide roadway shoulders, aprons, designated bus or shuttle stops, low traffic side streets, and the like. The stopping points are introduced into the GPS unit 32 and vehicle controller 21 along with the current, electronic roadmap as determined from the memory 34. The vehicle 20 is thereby autonomously driven using the vehicle controller and GPS unit 32 along with inputs from other on-board sensors, and inputs from sensors on-board other vehicles or infrastructure, at the latest after the stop command.

The GPS unit 32 is connected to a file 38 of destinations that enable a fast stop or a rapid stop. This, for example, involves information relating to the parking spaces of restaurants or shops, lay-bys, car parks and public, multi-storey car parks. It is advantageous for this file 38 of the stopping possibilities to be linked directly to a concrete destination or known point of interest, for example a shop or a restaurant, if a parking possibility for the shop or restaurant is involved. The file 38 of stopping possibilities can also be indirectly linked to a point of interest if the parking possibility offers a favorable access to this point of interest, and in particular is located close to it, e.g. directly adjacent to the location, within 100 meters walking distance, or within another distance as selected by the passenger.

A flow chart illustrating the method is shown in FIG. 2 for implementation by the vehicle control system 21. At the time START, the vehicle 20 under consideration is travelling autonomously along a determined route and in accordance with the previous destination input. At step 40, a passenger on-board the vehicle now suddenly discovers or determines a point of interest that was previously unplanned or provided to the vehicle control system. For example the passenger may see a restaurant, recognize a friend on the street, or discover a special shop, or otherwise have an immediate change of planned destination.

At step 42, the passenger initiates a stop request to the vehicle control system 21 by interacting with and providing an input to the human machine interface 22. The passenger may speaks to the interface 22. The passenger enters a command through the unit 24 for speech input, the module 26, and/or the screen 28. In one example, the passenger actuates the field 30, and also gives a spoken command input command to "Stop at the restaurant on the right".

At step 44, the interface interface 22 receives and recognizes this input and command, and processes it. The interface 22 and vehicle system controller 21 determines whether the indicated spontaneous destination along the route, e.g. the restaurant, has an available and associated quick stop location or possibility such as its own parking facility and, if that is not the case, whether another parking or other quick stop possibility to allow a passenger to exit the vehicle can be reached in the immediate neighborhood. A quick stop location may be a parking area, drop off area, apron, or other location that the vehicle may pull into and allow a passenger to safely exit the vehicle. The quick stop location may be determined to be within a predetermined distance of the intermediate, spontaneous destination, e.g. with 100 meters, or another specified distance, or alternatively, may be assigned to the location, such as an adjacent parking or drop off area. The software provided on the vehicle controller 21 of the vehicle 20 is configured to find a free parking space if one is available, and of autonomously parking in it.

At block 46, the control system 21 determines as to it is possible to stop, i.e. yes, or not, i.e. no. If yes, the vehicle 20 stops at the new selected location, and the method proceeds to box 48. The interface 22 additionally acknowledges the command by providing feedback to the passenger, for example with a speech output: "I will park in the nearest parking space".

If no, the interface 22 informs the passenger that it is not possible to stop, and the method proceeds to box 50. The interface 22 can additionally request information or input from the passenger as to whether the vehicle should look for and determine a suitable stopping place in the surroundings. The passenger can accept this, or can, however, forego and cancel the unscheduled stop.

In the present example, the controller 21 and interface 22 assumes, on the basis of the type of intermediate destination that has been chosen by the passenger, namely a restaurant, that a longer stop is impending. The type or category of destination may additionally be stored in memory 34 with the other destination information. In another example, if the passenger made a command to, "Stop, halt briefly, just for getting out", the controller 21 and interface 22 would have used the GPS unit 32, the library 34, and quick stop possibilities stored in the database 36 to choose a simple stopping point for a brief halt, and accordingly inform the passenger of this via the interface 22.

Independently of this, the interface 22 can request information from the passenger as to whether a shorter or longer halt is desired, or ask for an estimated length of time for the stop from the passenger. The control system 21 can accordingly determine whether only to drive to a simple stopping possibility, such as a passenger drop off zone, or to a parking place suitable for a longer duration, such as a car park. In various examples, the interface 22, having received a stop command, may additionally request the passenger for this to be confirmed once more or to be verified in some other way. A stop represents an interruption in the predetermined route and destination, may affect and delay other passengers on-board the vehicle, and also signifies a certain risk in road traffic. It may therefore be advantageous to verify a stop command.

The process is thereby completed, and the flow of the method has reached the END.

Terms such as "essentially", "preferably", and the like, along with data that might be understood as imprecise, are to be understood such that a deviation of plus-minus 5%, preferably plus-minus 2% and in particular plus-minus 1% from the normal value is possible. The Applicant retains the right to combine any features, as well as subsidiary features, from the claims and/or any features as well as partial features from the description together in any way, including outside the features of independent claims.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A method of controlling a vehicle comprising:
   receiving a stop command from an on-board passenger via a human machine interface indicative of an intermediate destination identified by the passenger for an immediate stop and not previously communicated to the vehicle during autonomous travel of the vehicle along a route to a previously selected final destination;
   identifying any stop locations within a predetermined distance of the intermediate destination based on a vehicle controller comparing data from a global positioning system (GPS) unit and a database of possible stop locations;
   informing the passenger that the immediate stop is possible in response to one of the identified stop locations being within a predetermined distance of the intermediate destination;
   in response to the immediate stop being possible, modifying the route to include one of the identified stop locations, autonomously driving the vehicle to the one of the identified stop locations, and stopping the vehicle on the basis of the stop command;
   informing the passenger that the immediate stop is not possible in response to determining that stop locations are unavailable within the predetermined distance of the intermediate destination; and
   in response to the immediate stop not being possible, maintaining autonomous travel of the vehicle along the route to the previously selected final destination.

2. The method of claim 1 wherein the stop command is received by the interface as one of a speech input, a gesture input, or input on a touch-sensitive screen.

3. The method of claim 1 further comprising receiving a signal indicative of actuation of a field on the interface by a passenger, the field actuation enabling the interface to receive the stop command.

4. The method of claim 3 wherein the interface will receive and process the stop command only subsequently to the field being actuated.

5. The method of claim 1 further comprising requesting, via the interface, a stop duration input from the passenger prior to informing the passenger that the immediate stop is possible.

6. A method comprising:
   in response to receiving a command from a passenger interface indicative of a intermediate destination for a spontaneous stop during autonomous travel of a vehicle along a route to a previously selected final destination, identifying any stop locations within a predetermined distance of the intermediate destination using data from a global positioning system (GPS) unit and a stop location database;
   informing the passenger that the spontaneous stop is possible in response to one of the identified stop locations being within the predetermined distance of the intermediate destination, modifying the route to include the one of the identified stop locations, and autonomously driving the vehicle to the one of the identified stop locations, and stopping the vehicle on the basis of the command; and
   informing the passenger that the spontaneous stop is not possible in response to determining that any stop locations are unavailable within the predetermined distance of the intermediate destination, and maintaining autonomous travel of the vehicle along the route to the previously selected final destination.

7. The method of claim 6 further comprising requesting, via the interface, a stop duration input from the passenger prior to informing the passenger that the spontaneous stop is possible.

8. The method of claim 6 wherein the command is received by the interface as one of a speech input, a gesture input, or input on a touch-sensitive screen.

9. The method of claim 6 further comprising, enabling the interface to receive the command in response to actuation of a field on the interface by a passenger.

* * * * *